United States Patent [19]
Hodgson et al.

[11] Patent Number: 4,750,201
[45] Date of Patent: Jun. 7, 1988

[54] CREDIT TRANSACTION ARRANGEMENTS

[75] Inventors: Thomas F. Hodgson, Billinge, Near Wigan; Michael W. Payne, Newbury; Peter C. Piegrome, Hale, all of England

[73] Assignee: Plessey Overseas Limited, Ilford, England

[21] Appl. No.: 902,253

[22] Filed: Aug. 29, 1986

[30] Foreign Application Priority Data

Sep. 10, 1985 [GB] United Kingdom ............... 8522427

[51] Int. Cl.$^4$ .......................................... H04M 17/02
[52] U.S. Cl. ........................................ 379/144; 379/91
[58] Field of Search .................... 379/91, 144, 123; 235/375, 385

[56] References Cited

U.S. PATENT DOCUMENTS

| 4,517,412 | 5/1985 | Newkirk et al. ............ 379/144 |
| 4,577,061 | 5/1986 | Katzeff et al. ............ 379/144 |

FOREIGN PATENT DOCUMENTS

| 0048868 | 4/1982 | European Pat. Off. . |
| 0088639 | 9/1983 | European Pat. Off. . |
| 8401073 | 3/1984 | PCT. Int'l Appl. . |
| 8603915 | 7/1986 | PCT. Int'l Appl. . |
| 1,565,445 | 4/1980 | United Kingdom . |
| 2105149 | 3/1983 | United Kingdom . |

OTHER PUBLICATIONS

Weinstein, S. B., "Smart Credit Cards: The Answer to Cashless Shopping" I.E.E.E. Spectrum, 2/84, p. 43.

Primary Examiner—Robert Lev
Attorney, Agent, or Firm—Michael F. Oglo; Julian C. Renfro

[57] ABSTRACT

The invention concerns call-charge payment of telephone calls from payphone telephone instruments (PI) using a credit card, or the like. The invention provides credit transaction arrangements for automatic call-charge payment of calls established through a telecommunications network from payphone instruments (PI). The payphone (PI) is provided with a credit card reader (CRM) which when activated causes the payphone (PI) to automatically set-up a path (NAP) through the telecommunications network to credit transaction equipment (CCE) at a remote location (NP) within the network. Initially, a first record data (HEAD), being relevant to prior call-charge payment, is transmitted over the path (NAP), validated and stored (CDS) at the credit transaction equipment (CCE), and the path is promptly disconnected. The subscriber then sets-up a communication path through the network to a desired called subscriber for communication purposes. Following the release of the communication path, second record data (TAIL), also being relevant to the current call-charge payment, is compiled in the payphone and subsequently transmitted to the credit transaction equipment (CCE) and combined with the first record data (HEAD) for call-charging payment purposes. A data base (DB) employing a computer is concerned with the bill processing.

16 Claims, 2 Drawing Sheets

CREDIT TRANSACTION ARRANGEMENTS

BACKGROUND OF THE INVENTION

The present invention relates to credit transaction arrangements.

In particular the arrangements are concerned with call-charge payment of calls established through a telecommunications network from so called payphone telephone instruments, payment for call-charges being made by way of user credit authorisation means in the form of a credit card, or the like.

SUMMARY OF THE INVENTION

According to the present invention there is provided credit transaction arrangements for automatic call-charge payment of calls established through a telecommunications network from payphone instruments, wherein cooperation of credit transaction authorisation means with an initiating payphone credit transaction authorisation reader means, causes the payphone to automatically set-up a path through the telecommunications network to credit transaction equipment at a location within the network, whereupon first record data (head), being relevant to call-charge payment, is transmitted over the path, validated and stored at the credit transaction equipment, whereupon the path is promptly disconnected, whereafter the subscriber sets-up a further path through the network to a desired called subscriber for communication purposes, and wherein following the release of said further path, second record data (tail), also being relevant to said call-charge payment, and which is compiled in the payphone, is subsequently transmitted to the credit transaction equipment and combined with the first record data (head) for call-charge payment processing.

The invention will be more readily understood from the following description of an exemplary embodiment which should be read in conjunction with the accompanying drawings in which;

DESCRIPTION OF THE PREFERRED EMBODIMENT

GENERAL

This invention is concerned with the arrangements for call-charging and payment of telephone calls made from so-called payphone telephone instruments. It is particularly concerned with payment being made by way of user credit transaction authorisation means in the form of universal credit charge cards such as VISA and ACCESS etc. and credit cards issued by telephone administrations for telephone call charging purposes. The latter service provides a so-called "Telecredit" facility and requires the keying-in of a subscriber personal identification number (PIN).

Figure 1:
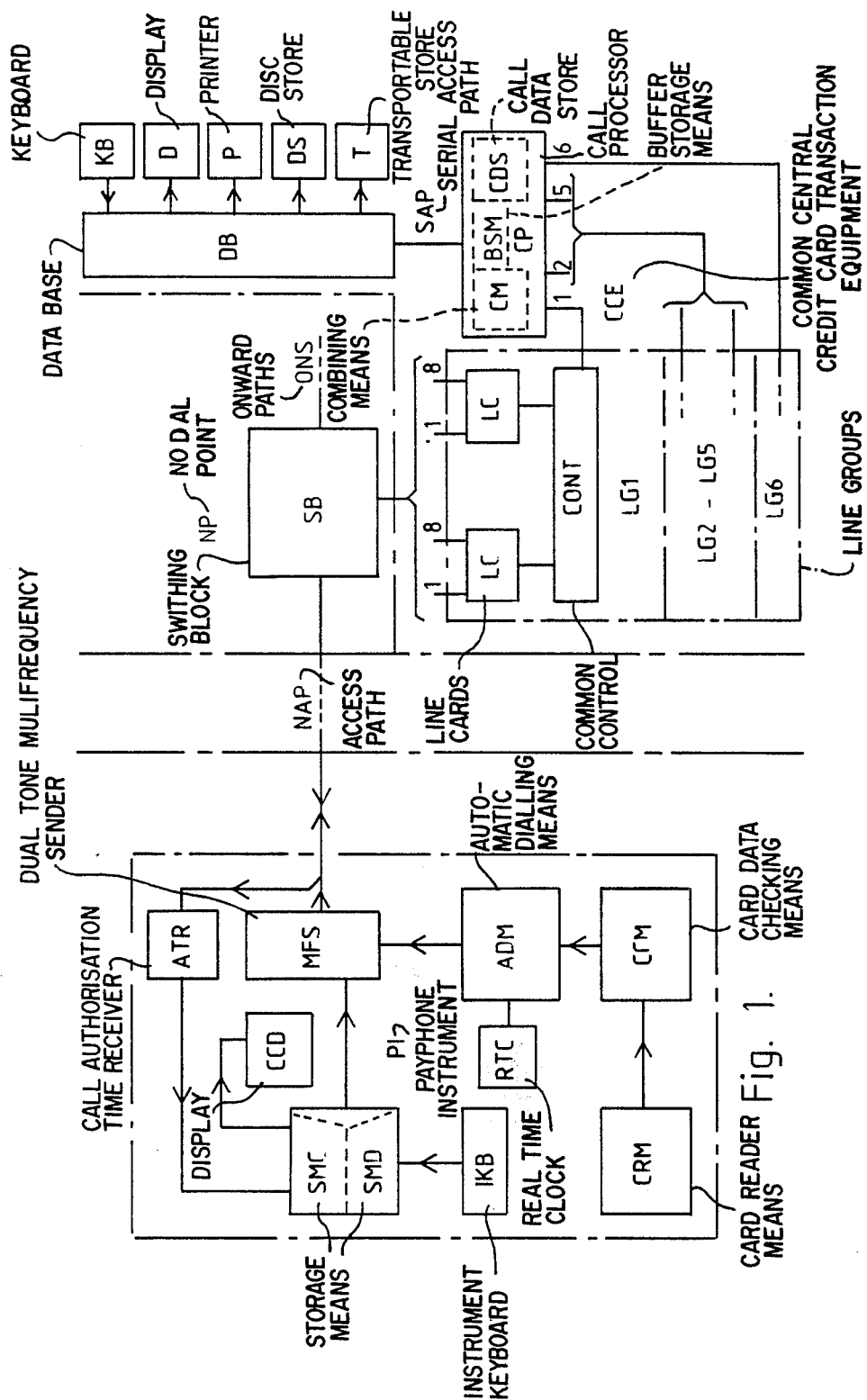
FIG. 1 shows a block schematic diagram of the arrangements in accordance with this invention; and, FIG. 2 shows a diagram of the general format of the call record data together with the arrangements for compiling and storing the data prior to being forwarded to a computer data base.

Referring now to the drawings it will be seen in FIG. 1 that the basic elements of the payphone instrument PI, concerned with this invention, are shown in block schematic form. The payphone is connectible via an access path NAP to common central credit card transaction equipment CCE located at a convenient nodal point NP in the telecommunications network. For example, the common equipment could be located at a local exchange or a trunk exchange. The common equipment arranges for the collection of call charging data in preparation for forwarding, by way of the serial access path SAP, to a computer data base DB which, amongst other things, handles the billing processing.

PAYPHONE INSTRUMENT

The payphone PI incorporates a magnetic card reader means fitted to the payphone casework. Internal card reader means CRM is provided which is powered from the line power.

The payphone incorporates a standard instrument keyboard IKB together with storage means SMD and SMC for storing keyed digits and incoming charge meter signals respectively. Card data checking means CCM is provided together with automatic dialling means ADM. A dual-tone multifrequency sender MFS and a call authorisation time receiver ATR is also provided to cater for sending and receiving signal arrangements respectively. A display CCD in the form of a liquid crystal display (LCD) is arranged to indicate the call fees.

CENTRAL CREDIT CARD TRANSACTION EQUIPMENT

The central credit card transaction equipment CCE, located at the convenient nodal point NP, in the telecommunications network is accessible through a switching block SB at the nodal point NP. The path ONS represents the path onward to other network stages.

The configuration of the equipment CCE is such that, up to six line groups LG1 to LG6 can be provided. Each line group includes two interface devices or line cards each catering for eight input access paths 1 to 8 (up to 96 line inputs) from the switch block SB.

An associated common control CONT is provided within each line group LG1 to LG6 and this arranges for all the control functions of the group including selection for generating any of a number of voice prompt messages as directed by a common call processor CP.

The call processor CP serves the six line groups and within it a call data store CDS arranges for compilation and storage of up to 1000 (one thousand) payphone call charge authorisation data CAD. The call processor CP also includes buffer storage means BSM for enabling temporary storage of second record data (TAIL) portion of charge authorisation data CAD, a call data store CDS for the compilation and storage of the first record data (HEAD) portion of the call authorisation data CAD within storage locations therein and combining means CM adapted to combine the first record data (HEAD) and the second record data (TAIL) for the same credit transaction. The call processor CP is also responsible for handling credit card and personal identification number (PIN) data validation and data error correction.

A data base DB, which is a proprietory computer (typically an IBM PCXT), includes standard peripherals including, keyboard KB, printer P, disc store DS, transportable store T and display D.

The data base DB, provides for call transaction storage bill (call-charge) processing, to a range of system control features through operator control.

Figure 2:
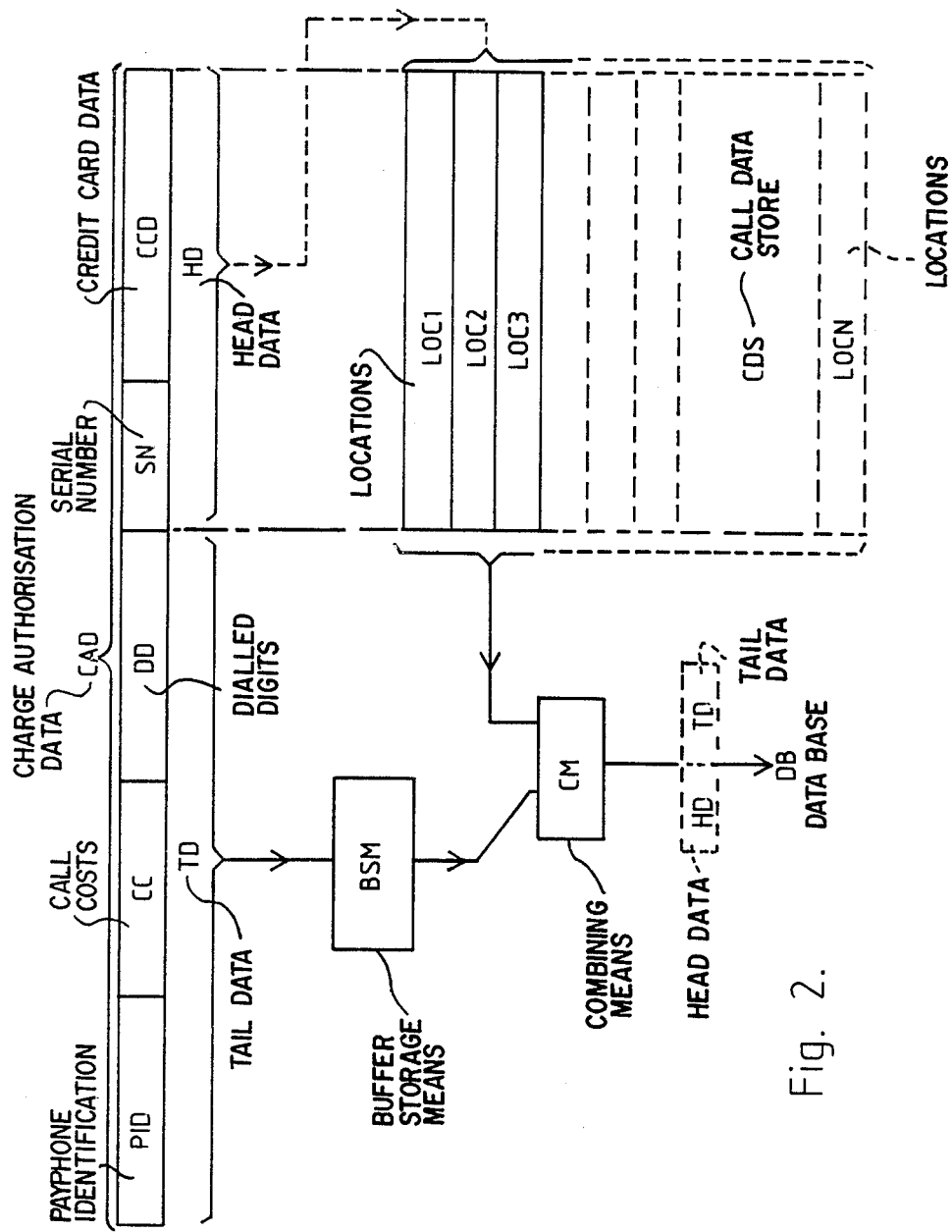

Referring now to FIG. 2, in which in the upper part of the diagram the essential elements of the CHARGE AUTHORISATION DATA (CAD) format are shown. The data comprises two main portions TAIL DATA (TD) and HEAD DATA (HD). The TAIL DATA (TD) includes data representing the PAYPHONE I.D. (PID) (I.D. is identification), CALL COSTS (CC) and DIALLED DIGITS (DD). The HEAD DATA (HD) includes data representing the SERIAL NUMBER (SN) of the call from the payphone and the CREDIT CARD DATA (CCD), which is taken from one of the data tracks on the particular credit transaction authorisation means (credit/charge card).

In the lower part of the diagram a schematic representation of the call data store CDS is depicted. The call data store is arranged to provide storage for up to 1000 payphones.

The chain-dotted arrowed line indicates that the HEAD data of the CHARGE AUTHORISATION DATA (CAD) is stored in locations LOCATION LOCI to LOCN and are indexed in these locations in payphone identification PID order. The TAIL DATA (TD) of the CALL AUTHORISATION DATA (CAD) is temporarily held in buffer storage means BSM and is combined within combining means CM with the corresponding HEAD DATA (HD) for the same credit transaction extracted from the call data store CDS and then forwarded to the data base DB as a combined call record of the call transaction.

An outline of the steps of the storage operations is discussed below.

| STEP | OPERATION |
|---|---|
| | INITIAL CALL |
| 1. | CAD of initial call transmitted from payphone (PI) to call processor (CP) at central credit card transaction equipment (CCE). The CAD containing HEAD DATA (Initial Serial No, Card Data) and TAIL DATA (DUMMY Payphone identification, null call cost and null dialled digit fields). |
| 2. | HEAD card data is VALIDATED. |
| 3. | If card data is NOT AUTHORISED FOR USE payphone (PI) is instructed NOT TO PROCEED WITH THE TRANSACTION and the call is cleared. ERROR RECORD is sent to data base (DB). Payphone (PI) adds initial TAIL DATA and the call processor (CP) discards HEAD and TAIL data. |
| 4. | If card data is AUTHORISED FOR USE payphone (PI) is instructed to ALLOW TRANSACTION(S) TO PROCEED. HEAD DATA is written to call processor (CP) store location (in call data store CDS) and indexed by TAIL DATA payphone identification data (currently in buffer storage means (BSM). TAIL DATA is then discarded. Payphone allows transactions to proceed and stores related TAIL DATA in payphone (PI). |
| | NEXT CALL |
| 1. | CAD of next call is transmitted from payphone (PI) to call processor (CP) at central credit card transaction equipment (CCE). The CAD containing HEAD DATA (Serial No, card data and TAIL DATA, Payphone ID, previous call cost and previous call dialled digits). |
| 2. | HEAD card data is VALIDATED. |
| 3. | If card data is NUT AUTHORISED FOR USE payphone (PI) is instructed not to proceed with transactions and call is cleared. ERROR RECORD is sent to DATABASE (DB), payphone (PI) retains TAIL DATA of previous call. Call processor (CP) |

| STEP | OPERATION |
|---|---|
| | -continued |
| | discards HEAD and TAIL data. |
| 4. | If card data is AUTHORISED FOR USE payphone (PI) is instructed to ALLOW TRANSACTIONS TO PROCEED. The TAIL DATA phone ID is used to access the location of the indexed HEAD DATA in call data store (CDS) to obtain the previous call HEAD DATA relating to the current TAIL DATA of the same credit transaction. This is now combined with CAD TAIL DATA to form a CALL RECORD which is subsequently transmitted to the data base (DB). CAD HEAD DATA is written to call data store (CDS) location indexed by the TAIL DATA payphone ID. Payphone (PI) allows current transaction to proceed and stores related TAIL DATA in the payphone (PI). |

For subsequent calls steps 1 to 4 of NEXT CALL are followed.

OPERATION

It should be noted that the payphone always assumes a coin call is to be made when the handset goes off hook. The insertion of a coin minimum fee will disable the card reader means CRM circuitry and allow the caller to make a normal payphone call into the network. The payphone does not access the credit card transaction equipment CCE during this type of call.

CREDIT CARD SERVICE

Setting up to the credit card transaction equipment.

When the subscriber goes off hook, the payphone PI assumes a coin call and the LCD flashes a display of the minimum coin fee. Dial tone is also returned to the payphone PI via the network.

When the subscriber slides a credit card within the credit card reading means CRM, card data is read from an appropriate data track on the card by the card reader means CRM, and is then forwarded to card data checking means CCM which performs a local security check on the data. Upon the check being completed, and the CCM indicating a probable valid card, a signal is sent to the automatic dialling means ADM, whereupon the payphone PI automatically dials the credit card transaction equipment CCE, using an access code, through the multifrequency sender MFS and using dual tone multifrequency DTMF signalling.

The access code comprises a plurality of routing digits (up to a maximum of twelve) to enable path selection through the network. These digits are programmable at the payphone PI as appropriate.

The LCD now changes to flashing minimum card fee, the coin handling mechanism is disabled, and coins previously inserted are immediately refunded.

Successful access to the CCE results in an in band tone signal being returned to the payphone PI from the CCE, instructing the payphone to send "Charging and Authorisation Data" (CAD) forward. The tone is present for up to 5 seconds. Failure to receive the in band tone within T1 seconds (see LIST 1—various timeouts) of the end of automatic dialling from the payphone results in the payphone PI clearing the call and returning NU tone locally to the subscriber.

During the transfer of the CAD to the CCE, the payphone enables the user to listen to a suitable level of the DTMF signals being transmitted.

TRANSFER OF CHARGING AND AUTHORISATION DATA (CAD)

Transfer of the CAD to the CCS is at full automatic speed, DTMF (MF4), with error detection/correction. The nominal transfer rate is 51/51 ms, software adjustable in 8.5 ms steps.

The CAD transferred by the payphone PI to the CCE consists of:

(a) Payphone I/D (Identification) (3 char.)
(b) Card Details—current call
(c) Call Ser. No. (1 char.)
(d) Charge Units (4 char.)—previous transaction
(e) No. of Calls/Transactions (1 char.)—previous transaction
(f) Dialled digits (these digits transferred as an optional facility)—previous transaction.

If 'n' (No. of calls)=0 then the charge unit field is not transmitted.

If 'n'=1 then the dialled digits transmitted are relevant to the call incurring most cost.

Successful receipt of the CAD results in a voice prompt from the control CONT in the CCE, followed by an in band signal. The voice prompt invites the caller to dial after hearing dial tone. The in band signal instructs the payphone to clear forward and establish a call into the network and dial tone is returned to the caller.

At the CCE the call processor CP time and date stamps the CAD and creates a partial call record (head) for this particular payphone. The CCE sends up to 5 secs. of clear forward tone, then force releases.

Failure by the caller to start dialling within T2 seconds (LIST 1—various timeouts) of dial tone results in the payphone returning NU tone to the caller, then clearing forward.

Unsuccessful receipt of the CAD due to transmission errors, or logical errors (e.g. card expired, card type invalid) by the CCE, results in a range of voice messages inviting the caller to re-enter his card or abort the transaction. Three card swipes are allowed before a final voice prompt is given advising the caller to relinquish use of the equipment, followed by NU tone. The CCE will force release the line if the payphone does not clear forward within T7 seconds. (See LIST 1—various timeouts).

If the in band tone is not received within T3 seconds (see LIST 1) of CAD transmission, the payphone clears forward and returns NU to the caller.

Charging data accumulated by the payphone for any transaction is normally transferred to the CCE as part of the CAD of the next transaction. This data is also subject to time and date stamping by the call processor CP. In order to ensure that charging data is successfully transferred during periods of low usage, a timer T5 minutes (1 to 750—LIST 1) is set at the termination of each authorised transaction. On expiry of the timer the payphone makes an automatic call to the CCE to transfer the charge authorisation data (CAD) TAIL DATA. During the automatic transfer of the data, the payphone appears dormant to the user i.e. the microphone and receiver are muted, and the display is blank.

LIST 1—VARIOUS TIMEOUTS

Timers
T1 Range 5–30 seconds

Timeout to receipt of in band tone at the payphone from the end of auto dialling prior to payphone clearing the call and returning NU tone to the subscriber.

T2 Range 10–60 seconds

Timeout to commencement of dialling following receipt of credit authorisation tone. Credit authorisation is terminated and NU returned to the subscriber if the timer matures.

T3 Range 1–300 seconds

Long timeout to receipt of credit authorisation tone following CAD transmission. The payphone will clear forward and return NU tone locally if the timer matures.

T4 Range 1–72 minutes

Overall call duration timeout set by the payphone for all unsuccessful calls (i.e. those without call subscriber answer, CSA).

T5 Range 1–720 minutes

Timeout to ensure transmission of charging data during low usage periods. Timed from termination of each authorised transaction. The payphone will make an automatic call to the CCE to transfer charging data on expiry of timer.

T6 Range 1–24 hours

Age limit to clear all partial records held in CCE to IBM PC and the end of each day.

T7 Range 15–30 seconds

Timeout for clear forward from payphone following final voice prompt advising caller to relinquish the use of the equipment.

LIST 2—MESSAGES AND ANNOUNCEMENTS (VOICE PROMPTS)

| Message no. | Announcement |
| --- | --- |
| 1 | Please wait for dial tone then dial the telephone number you require. |
| 2 | Please key in your 4 digit Personal Identity Number. |
| 3 | We have detected an error, please enter your Personal Identity Number again. |
| 4 | We are sorry, but the service you have dialled is not available from this payphone. |
| 5 | We are sorry, but your credit card is not authorised for use with this service. |
| 6 | We are sorry, but we have detected an error. Please slide your card again. |

THE SUBSCRIBER CALL

The authorised call is set up as a normal call into the network and the subscriber dials unrestricted into the network. The payphone stores (store SMD) all dialled digits which can be optionally transferred as part of the CAD. This option is set from the payphone.

An overall duration limit of T4 minutes (adjustable in the range 1–72) is set by the payphone for all unsuccessful calls (i.e. those without call subscriber answer CSA).

CALL CHARGING

On receipt of call subscriber answer (CSA) the payphone LCD freezes the display with the minimum chargeable fee for this call and extinguishes the minimum fee indication. The LCD is incremented once a minimum number of meter pulses has been received, this being subject to the minimum fee set. On completion of the call, the call costs are stored (store SMC) in the payphone and transferred during the next authorised transaction, or on expiry of timer T5 (see LIST 1) as part of the TAIL DATA. This timing is achieved by the real time clock RTC.

The various steps of the credit card call and the subscriber call are summarised as follows:

CREDIT CARD CALL

1. CALLER GOES 'OFF HOOK'
   Payphone initially assumes coin call
   LCD Display minimum coin fee
   Dial tone returned from network
2. CALLER SWIPES CARD
   Payphone performs local security check on credit card
   Payphone autodials credit card system—access code
   LCD changes to minimum card fee
   Coin handling disabled
3. CREDIT CARD SYSTEM RETURNS SUCCESSFUL ACCESS TONE
   In band signal returned to payphone
4. PAYPHONE TRANSMITS CHARGE AUTHORISATION DATA 'CAD' TO CREDIT CARD SYSTEM
   Data transmitted in DTMF
   CAD comprises:
     Card No.
     Payphone identity
     Call serial number
   Comfort tone returned to call
5. CREDIT CARD SYSTEM VALIDATES CARD DETAILS
   Partial record created in call processor (Head)
   Computerised voice message returned to caller, e.g. "Please dial when you hear dial tone" "Invalid Card" "Please try again"
   In band tone returned to payphone to instruct it to clear forward and release credit card equipment
6. PAYPHONE RESIEZES LINE CIRCUIT
   On receipt of band tone payphone clears forward and resiezes the local line circuit
   Dial tone returned to caller
7. CALLER DIALS INTO THE NETWORK UNRESTRICTED
   Payphone stores dialled digits—optional
8. CALL ESTABLISHED
   Call subscriber answers
   LCD displays call cost
   Metering pulses increment LCD
9. CALLER CLEARS DOWN
   Call costs stored in payphone
   Dialled digits stored in payphone—optional T CALLER GOES 'OFF HOOK' AND SWIPES CARD
   Payphone performs local security check on credit card
   Payphone autodials credit card system access code
   LCD changes to minimun card fee
   Coin handling disabled
11. CREDIT CARD SYSTEM RETURNS SUCCESSFUL ACCESS TONE
12. PAYPHONE TRANSMITS CHARGE AUTHORISATION DATA 'CAD' TO CREDIT CARD SYSTEM
    Data transmitted in DTMF
    CAD comprises:
      Card No.
      Payphone identity
      Call serial no.
      Call cost
      Dialled digits—optional
    Comfort tone returned to caller
13. CREDIT CARD SYSTEM VALIDATES CARD DETAILS
    Partial call record created in call processor (Head)
    Previous 'Head' combined with 'Tail' and forwarded to data base
    Computerised voice message returned to caller
    In band tone returned to payphone

TELECREDIT CARD SERVICE

Setting up to the Credit Card Transaction Equipment

The setting up procedure to the Credit Card Transaction Equipment CCE is identical to that required for a standard Credit Card as has been just discussed.

Transfer of Charging and Authorisation Data (CAD)

Transfer of the CAD to the CCE is at full automatic speed DTMF (MF4) with error detection/correction. The nominal transfer rate shall be 51/51 ms, software adjustable in 8.5 ms steps. The CAD transferred by the payphone to the CCE consists of:

(a) Payphone I/D (3 char.)
(b) Card detailings including local PIN encryption —current call
(c) Call Serial No. (1 char.)
(d) Charge Units (4 char.)—previous transaction
(e) No. of calls/transactions (1 char.)—previous transaction.

Successful receipt of the CAD results in a voice prompt (See LIST 2—messages and announcements) from the CCS (generated from the common control CONT in the specific line group LG) requesting the subscriber to key in his PIN at the payphone. The PIN comprises four digits and is transferred to the CCS as keyed in.

Successful validation of the keyed PIN against the encrypted PIN (by call processor CP) results in a voice prompt message (see LIST 2) from the CCE followed by an in band signal. The voice prompt message invites the caller to dial after hearing dial tone. The in band signal instructs the payphone to clear forward and return dial tone immediately to the caller.

PIN verification failure due to transmission errors or incorrect keying results in a voice prompt message (see LIST 2) requesting the subscriber to re-enter his PIN number. Three attempts are allowed before a final voice prompt message (see LIST 2) is given advising the caller to relinquish use of the equipment.

Failure by the caller to start dialling within T2 seconds of dial tone results in the payphone returning NU tone to the caller and clearing forward. Unsuccessful receipt of the CAD due to transmission errors or logical errors (e.g. card expired, card type invalid) by the CCE results in a range of voice prompt messages inviting the caller to re-enter his card or abort the transaction. Three card swipes are allowed before a final voice prompt message is given advising the caller to relinquish use of the equipment.

If the in band tone is not received within T3 seconds of keyed PIN transmission, the payphone will clear forward and return NU tone to the caller.

Charging data accumulated by the payphone for any transaction is normally transferred to the CCE as part of the CAD of the next transaction.

In order to ensure that charging data is successfully transferred during periods of low usage, a timer T5 minutes (range 1–720) is set at the termination of each authorised transaction. On expiry of the timer the payphone makes an automatic call fo the CCE to transfer the charging data.

THE SUBSCRIBER CALL

The subscriber call proceeds in an identical manner to that described previously.

The various steps of the telecredit card call are summarised as follows:

TELECREDIT CARD CALL—TELECOM ADMINS. OWN CARD

1. CALLER GOES 'OFF HOOK'
   Payphone initially assumes coin call
   LCD displays minimum coin fee
   Dial tone returned from network
2. CALLER SWIPES CARD
   Payphone performs local security check on credit card
   Payphone autodials credit card system access code
   LCD changes to minimum card fee
   Coin handling disabled
3. CREDIT CARD SYSTEM RETURNS SUCCESSFUL ACCESS TONE
4. PAYPHONE TRANSMITS CHARGE AUTHORISATION DATA 'CAD' TO CREDIT CARD SYSTEM
   Data transmitted in DTMF
   CAD comprises:
      Card details with encrypted PIN No.
      Payphone identity
      Call serial no.
   Comfort tone returned to caller
5. CREDIT CARD SYSTEM REQUESTS PIN NUMBER
   Computerised voice message to caller "Please enter PIN number"
6. CALLER KEYS IN PIN NUMBER
   4 digit PIN transmitted to credit card system
   Credit card system validates card and compares keyed PIN with that encrypted in card
   If OK partial call record created in call processor (Head)
   Computerised voice message returned to caller e.g. "Please dial when you hear dial tone" "Invalid card" "Please try again"
   In band tone returned to payphone to instruct it to clear forward and drop system
7. CALL PROCEEDS AS PER ACTIONS 6 TO 9

COIN CALL

1. CALLER GOES 'OFF HOOK'
   Payphone initially assumes coin call
   LCD displays minimum coin fee
   Dial tone returned from network
2. CALLER INSERTS MINIMUM FEE
   Card reader circuitry disabled
   Payphone does not access credit card system
   Caller dials unrestricted into the network
3. CALL PROGRESS AS PER STANDARD PAYPHONE OPERATION

CALL RECORD STORAGE

The call records are stored at the data base DB which employs a split file operation. Call records (up to 100,000), are stored on the 10 M byte hard disc DS in a working file. Call records, which have previously been transferred to transportable magnetic media T, are suspended on a back up file. When the administration wishes to transfer records from the live file, the back up file becomes the new live file and the current live file becomes the back up. This working/back up file relationship is only changed by explicit operator action or from a preprogrammed dump command, when the working file becomes the back up and vice versa. Call records are automatically transferred from the CCE periodically at a fixed time of day if the creation time is earlier than T6 (LIST 1) from the current time. This will effectively clear out HEADS without TAILS.

BILLING

The CCS generates a chronological list of itemised bills for each of the credit/charge card types on the system. A separate file is also be generated for the Administrations own card. Separate files are generated for each card type and these are transferred on call record download to the transportable magnetic media T.

In the case of the standard credit cards, these are issued direct to the credit card companies or through a sponsoring bank. The billing cycle will be completed within 3 days. As this time the administration receives credit direct from the credit card companies and the card holders are debited in their monthly accounts.

In the case of the Telecredit Card the billing information is forwarded to the billing centre. Telecredit cards are issued to existing subscribers or postal subscribers who are billed in line with the normal billing procedures.

We claim:

1. Credit transaction arrangements for automatic call-charge payment of calls established through a telecommunications network from payphone instruments, wherein cooperation of credit transaction authorisation means with an initiating payphone credit transaction authorisation reader means, causes the payphone to automatically set-up a path through the telecommunications network to credit transaction equipment at a location within the network, whereupon first record data (HEAD), being relevant to call-charge payment, is transmitted over the path, validated and stored at the credit transaction equipment, whereupon the path is promptly disconnected, whereafter the subscriber sets-up a further path through the network to a desired called subscriber for communication purposes, and wherein following the release of said further path, second record data (TAIL), also being relevant to said call-charge payment, and which is compiled in the payphone, is subsequently transmitted to the credit transaction equipment and combined with the first record data (head) for call-charge payment processing.

2. Credit transaction arrangements as claimed in claim 1, wherein first record data (HEAD) and second record data (TAIL) are charge authorisation data wherein the first record data (HEAD) is associated with the credit transaction of the current call, whereas the second record data (TAIL) is associated with the credit transaction of the call immediately preceding the current call.

3. Credit transaction arrangements as claimed in claim 2, wherein the first record data (HEAD) and the second data (TAIL) are transmitted during the current call credit transaction.

4. Credit transaction arrangements as claimed in claim 2, wherein the first record data (HEAD) is transmitted during the current call and the second record data (TAIL) is transmitted following the expiry of a timeout when said path to the credit transaction equipment is set-up automatically.

5. Credit transaction arrangements as claimed in claim 3 or 4, in which the first record data (HEAD) includes credit card data and call serial number data, whereas the second record data (TAIL) includes the payphone identification data, call cost data, and dialled digit data.

6. Credit transaction arrangements as claimed in claim 5, wherein the transmission of dialled digit data is selected for transmission as an optional facility at the payphone instrument.

7. Credit transaction arrangements as claimed in claim 6, wherein the credit transaction authorisation reader means, is credit card reader means, which is incorporated in the payphone instrument and cooperation of the credit transaction authorisation means, which is credit card means, with the credit card reader means by a payphone subscriber sliding the credit card means within the card reader means, enables data to be read from the credit card means where it is forwarded to card data checking means, within the payphone instrument, which thereupon performs a local security check upon the card data.

8. Credit transaction arrangements as claimed in claim 7, wherein upon the local security check being completed, and indicating a probable valid card, said path to the credit card transaction equipment is set-up by automatic dialling means within the payphone, by the automatic dialling of an access code comprising a plurality of routing digits.

9. Credit transaction arrangements as claimed in claim 8, wherein upon access to the credit card equipment being successful, a signal is returned to the payphone instrument and the charge authorisation data is released from storage means within the payphone instrument and transmitted over said path to the credit card equipment.

10. Credit transaction arrangements as claimed in claim 9, wherein upon successful receipt and validation of the charge authorisation data, a voice prompt message is sent to the payphone instrument from the credit card equipment which instructs the caller to commence dialling to effect a subscriber call connection upon receipt of dial tone, the payphone instrument is instructed to release the line forward to the credit card equipment and then re-seize the line to the local line circuit, whereupon said dial tone is delivered to the payphone instrument.

11. Credit transaction arrangements as claimed in claim 9, wherein when the credit card in use is a telephone administration credit card, upon successful receipt and validation of the charge authorisation data, a voice prompt message is sent to the payphone instrument from the credit card equipment which instructs the caller to enter his personal identification number, wherein upon this number being transmitted to the credit card equipment, successfully received and validated, a further voice prompt message is sent to the payphone instrument from the credit card equipment which instructs the caller to commence dialling to effect a subscriber call connection upon receipt of dial tone, the payphone instrument is instructed to release the line forward to the credit card equipment and then re-seize the line to the local line circuit whereupon said dial tone is delivered to the payphone instrument.

12. Credit transaction arrangements as claimed in claim 10 or 11, wherein the digits dialled to establish the subscriber call connection and incoming call charge signals are stored in the storage means within the payphone instrument.

13. Credit transaction arrangements as claimed in claim 12, wherein the credit transaction equipment is a common equipment and comprises, (i) a plurality of line groups each of which includes at least two interface devices or line cards each catering for a plurality of input-paths from a switching block at said location and a common control providing the control functions of the line group, (ii) a call processor provided in common to the line groups and which is responsible for validation of charge authorisation data and personal identification number data, and which includes (a) a call data storage means which arranges for compilation and storage of said first record data (HEAD) portion of said charge authorisation data and (b) buffer storage means for enabling temporary storage of said second record data (TAIL) portion of the charge authorisation data, and (C) combining means for combining first record data (HEAD) with second record data (TAIL), and (iii) a data base comprising a computer including a keyboard, printer, disc store, transportable store, and display, the data base providing for call transaction storage, bill processing and access to system control facilities through operator control.

14. Credit transaction arrangements as claimed in claim 13, wherein each line group controller is selectively directed to generate any one of a plurality of said voice prompt messages by the call processor.

15. Credit transaction arrangements as claimed in claim 13, wherein the call data storage means includes a plurality of storage locations being provided for storage of the first record data (HEAD) which are indexed in said storage locations in payphone identification data order, wherein when second record data (TAIL) is received at the credit transaction equipment from the payphone instrument, it is temporarily stored in said buffer storage means, whereupon the payphone identification data of the second record data (TAIL) is employed to access the storage locations of the indexed first record data (HEAD) in order to combine the first record data (HEAD) and the second record data (TAIL) for the call authorisation data relating to the same credit transaction in preparation for forwarding a combined call record to the data base.

16. Credit transaction arrangements as claimed in claim 15, wherein combined call records are transferred periodically to the data base automatically by way of an access path between the call processor and the data base.

* * * * *